US00RE39388E

(19) United States
(12) Reissued Patent
DeBartolo

(10) Patent Number: US RE39,388 E
(45) Date of Reissued Patent: Nov. 14, 2006

(54) CLEARVISION RIDESAFE GLOVE

(76) Inventor: William E. DeBartolo, 38W010 Highland Ave., Elgin, IL (US) 60123

(21) Appl. No.: 10/374,544

(22) Filed: Feb. 26, 2003

Related U.S. Patent Documents

Reissue of:
(64) Patent No.: 6,367,116
Issued: Apr. 9, 2002
Appl. No.: 09/626,227
Filed: Jul. 26, 2000

(51) Int. Cl.
*A47L 13/11* (2006.01)
*A47L 13/18* (2006.01)

(52) U.S. Cl. ..... 15/245; 15/227; 2/160; 2/161.6; D32/41; D32/42

(58) Field of Classification Search ..... 15/227, 15/245; 2/158, 159, 160, 161.1, 161.6, 161.8; D32/41, 42
See application file for complete search history.

(56) References Cited

U.S. PATENT DOCUMENTS

| | | | | | |
|---|---|---|---|---|---|
| 1,279,855 | A | | 9/1918 | Garvey | 2/168 |
| 1,530,327 | A | * | 3/1925 | Redlick | 401/7 |
| 1,559,114 | A | | 10/1925 | Maranville | 15/227 |
| 1,885,572 | A | | 11/1932 | Wood | 601/137 |
| 1,979,130 | A | | 10/1934 | Wiley | 2/168 |
| 2,049,323 | A | | 7/1936 | Schmidt | 15/227 |
| 2,187,430 | A | | 1/1940 | Olmstead et al. | 2/168 |
| D169,047 | S | | 3/1953 | Sebrell | D29/117.1 |
| 2,880,436 | A | | 4/1959 | Hayden | 15/118 |
| D188,035 | S | | 5/1960 | MacKay et al. | D2/622 |
| 3,500,477 | A | | 3/1970 | Meszaros | 2/161.8 |
| D225,139 | S | | 11/1972 | Vennettilli | D29/117.1 |
| 4,051,553 | A | * | 10/1977 | Howard | 2/20 |
| 4,224,692 | A | * | 9/1980 | Sundberg | 2/161.8 |
| 4,342,128 | A | | 8/1982 | Doyle | 15/245 |
| 4,441,213 | A | * | 4/1984 | Trumble et al. | 2/16 |
| 4,495,668 | A | * | 1/1985 | Adams | 15/105 |
| 4,757,556 | A | * | 7/1988 | Girard | 2/160 |
| 4,787,113 | A | * | 11/1988 | Kamenske | 15/245 |
| 4,807,322 | A | * | 2/1989 | Littledeer | 15/121 |
| 4,827,557 | A | | 5/1989 | Siler, Jr. et al. | 15/245 |
| 4,847,915 | A | * | 7/1989 | Keene | 2/19 |
| 4,881,276 | A | * | 11/1989 | Swan | 2/161.1 |
| 4,893,373 | A | * | 1/1990 | Kato | 15/245 |
| D306,366 | S | * | 2/1990 | Turpie | D32/42 |
| 5,076,521 | A | | 12/1991 | Neubauer | 248/188 |
| D347,716 | S | | 6/1994 | Pomerleau | D32/46 |
| 5,429,678 | A | | 7/1995 | Fany | 134/6 |
| 5,729,857 | A | | 3/1998 | Martin et al. | 15/111 |
| 5,848,440 | A | * | 12/1998 | Pajarola | 2/161.1 |

(Continued)

FOREIGN PATENT DOCUMENTS

| | | | | |
|---|---|---|---|---|
| GB | 2050815 | * | 1/1981 | 15/245 |
| GB | 1597837 | * | 9/1981 | 15/245 |
| JP | 11-4792 | * | 1/1999 | |

*Primary Examiner*—Mark Spisich
(74) *Attorney, Agent, or Firm*—Knobble Yoshida & Dunleavy, LLC

(57) ABSTRACT

The present invention 10 discloses a glove 11 having an elongated elastomeric base member 34 substantially positioned over the proximal thumb phalanx 30 having a plurality of pliable blade-like elements 28 whereby the wearer 23 of the gloves can extend the thumb 30 and in a single motion using the pliable blade-like elements 28, wipe the transparent visor portions 20 of eye protection devices 24 without totally obstructing the vision of the wearer. The elongated elastomeric member 34 is comprised of a plurality of pliable blade-like elements 28 exteriorly positioned on the glove 11 extending through an aperture 38 to a planar flange element 40 located between the exterior glove material 36 and the interior glove liner 14 providing structure 46 for fixedly positioning the elongated elastomeric member 34 to the exterior 36 and/or interior layer 42 of the glove by any structure 46 known within the art, such as, bonding, sewing or riveting.

24 Claims, 11 Drawing Sheets

U.S. PATENT DOCUMENTS

| | | | | | |
|---|---|---|---|---|---|
| 5,887,282 | A | * | 3/1999 | Lenhart | 2/159 |
| 6,014,775 | A | * | 1/2000 | Missry | 15/161.2 |
| 6,018,837 | A | * | 2/2000 | Andreu | 15/118 |
| 6,092,238 | A | | 7/2000 | Fierabend, Jr. | 2/161.8 |
| D435,146 | S | | 12/2000 | Collier | D29/123 |
| 6,351,867 | B1 | * | 3/2002 | Forster | 15/121 |
| 6,367,116 | B1 | | 4/2002 | DeBartolo | 15/245 |
| 2004/0074036 | A1 | | 4/2004 | Collier | 15/245 |

* cited by examiner

CLEARVISION RIDESAFE GLOVE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to gloves and, more specifically, to gloves having an elongated elastomeric member substantially positioned over the proximal thumb phalanx having a plurality of pliable blade-like elements whereby the wearer of the gloves can extend the thumb and in a single motion using the pliable blade-like elements, wipe the transparent portions of eye protection devices without totally obstructing the vision of the wearer.

The elongated elastomeric member is comprised of a plurality of pliable blade-like elements exteriorly positioned on the glove extending through an aperture to a planar flange element located between the exterior glove material and the interior glove liner providing means for fixedly positioning said elongated elastomeric member to the exterior and/or interior layer of the glove by any means well known within the art, such as, bonding, sewing or riveting.

The glove of the present invention is designed for snowmobiles, motorcycles, skiers, ATV riders, fireman shields and other persons wearing helmeted face shields or eye protection devices that may become obstructed due to weather or environmental conditions.

The hazards for the individual are exponentially increased when motorized vehicles are considered as they will project wet particle matter for considerable trailing distance. It becomes especially hazardous for riders of open trailing vehicle where the wet particle matter will accumulate on protective eyewear or face shields. Attempts to clean the transparent elements will often result in smearing the particle matter causing poorer visual conditions.

2. Description of the Prior Art

There are other gloves having special features, some of them having vision clearing device designed for clearing goggles or glasses. Typical of these is U.S. Pat. No. 4,051,553 issues to Howard on Oct. 4, 1977.

Another patent was issued to Sundberg on Sep. 30, 1980 as U.S. Pat. No. 4,224,692. Yet another U.S. Pat. No. 4,441,213 was issued to Trumble et al. on Apr. 10, 1984 and still yet another was issued on Jul. 19, 1988 to Girard as U.S. Pat. No. 4,757,556.

Another patent was issued to Kamenske on Nov. 29, 1988 as U.S. Pat. No. 4,787,113. Yet another U.S. Pat. No. 4,847,915 was issued to Keene on Jul. 18, 1989. Another was issued to Swan on Nov. 21, 1989 as U.S. Pat. No. 4,881,276 and still yet another was issued on Dec. 15, 1998 to Pajarola as U.S. Pat. No. 5,848,440.

Another patent was issued to Lenhart on Mar. 30, 1999 as U.S. Pat. No. 5,887,282. Yet another U.S. Pat. No. 6,014,775 was issued to Missry on Jan. 18, 2000 and still yet another was issued on Feb. 1, 2000 to Andreu as U.S. Pat. No. 6,018,837.

U.S. Pat. No. 4,051,553

Inventor: Arthur R. Howard

Issued: Oct. 4, 1977

For football, a hard foam rubber pad is affixed to the back of a lightweight cotton glove. The pad extends over the knuckles, (metacarpo-phalangeal joint), of a hand inserted in the glove. The pad is molded so as to force the fingers to naturally curl without conscious effort, but allowing the fingers to be straightened with conscious effort. By curling the fingers, the probability that the fingers will be bent backward over the back of the hand with resultant injury is greatly reduced. The pad also protects the back of the hand from direct injury. In addition, latex rubber affixed to the fingers, thumb, and palm of the glove enables an athlete to grip a ball with greater facility.

U.S. Pat. No. 4,224,692

Inventor: Darrell W. Sundberg

Issued: Sep. 30, 1980

A multi-layer work glove is formed of a two part interior fabric lining directly contacting and encompassing the hand of the wearer with side seams joining the two parts in which an exterior surface layer of plastic material is bonded to the fabric lining and where a plurality of vent holes is formed through the interior fabric lining and the exterior surface layer of plastic material at web locations between the fingers and thumb of the hand outside of the work engaging surfaces.

U.S. Pat. No. 4,441,213

Inventor: William P. Trumble et al.

Issued: Apr. 10, 1984

A flexible, tear resistant, particularly for use near live wires or equipment, is of unitary structure, having an inner layer of natural rubber, particularly suited for high voltage protection, and an outer layer of urethane elastomer bonded thereto and giving tear and abrasion resistance. Bulges are formed across the back of the main portion of the glove and across the back at each finger and the thumb, to provide excess material which permits ready bonding of fingers and thumb for gripping, without restriction by the glove.

U.S. Pat. No. 4,757,556

Inventor: Donald A. Girard

Issued: Jul. 19, 1988

A glove for a skier or motorcyclists or other person wearing goggles or glasses. The glove has a front glove portion for covering the palm and adjacent forward portions of the fingers, and an enclosing portion connecting the opposite sides of the front portion and enclosing the rest of the hand and fingers. A short, flexible, though somewhat stiff, squeegee is secured to said enclosing portion and extends outwardly therefrom, so that the user can employ the squeegee to free his goggles or glasses from snow or rain deposited thereon.

U.S. Pat. No. 4,787,113

Inventor: David R. Kamenske

Issued: Nov. 29, 1988

A squeegee for mounting on the back of a operator's hand, comprising a base portion; a device for attaching the base portion to a operator's hand, such device preferably a strap, a upwardly projecting portion attached to said base at its lower end, the upwardly projecting portion being flexible and thin enough for good wiping qualities. The outwardly projecting portion being thick enough to avoid a tendency to ride over the top of water on a smooth surface to be squeegeed.

U.S. Pat. No. 4,847,915

Inventor: Howard B. Keene

Issued: Jul. 18, 1989

The invention involves a baseball glove with a flexible heel construction. The glove comprises a front panel forming the front wall of the glove and a back panel forming the back wall of the glove, the front and back panels being secured together at peripheral margins of the glove to form a glove shell having finger and thumb stalls. A liner having a palm liner panel is disposed on the inside of the shell. The front panel and the palm liner panel of the glove have lower edge margins arranged so that the outside face of the front panel is in opposing face-to-face relation with the outside face of the palm liner panel. The edge margins are stitched together to form a flexible heel seam running across the bottom of the glove with the stitching being substantially concealed from view. A relatively thin flexible heel pad is disposed between the front panel and the palm liner panel above the heel seam. The front panel and the palm liner panel, as secured together by the aforesaid flexible heel seam, combine with the flexible heel pad to form a flexible heel construction which is readily flexible to facilitate closing of the glove.

U.S. Pat. No. 4,881,276

Inventor: Richard L. Swan

Issued: Nov. 21, 1989

A cold weather sports glove including at least one of the fingers or thumb having an area of low coefficient of friction and at least one opposing finger or thumb having an area of high coefficient of friction. The glove is formed with a layer of compressible neoprene foam rubber, which forms the outer surface of the glove having a high coefficient of friction. Nylon pads are coupled to the outer surface of the foam rubber layer at the distal ends of pre-selected fingers or thumb. The area of low friction, formed by the nylon pads, permits the user to perform activities requiring a relative slipping motion between the user's finger or thumb and the device being used. The area of high friction, formed by the foam rubber layer, permits the user to grasp and release objects with more sensitivity and precision due to its compressibility. In fishing, preferably the thumb and index finger of the glove have areas of low coefficient of friction. In hunting, preferably the index finger of the glove is covered with an area of low coefficient of friction on both its palm and backhand sides. In archery, preferably the index finger, the middle finger and the pinky have areas of low coefficients of friction on their palm side to permit the bowstring to slide thereon when released. In a snowmobile mitt, preferably the index finger has an area of low coefficient of friction, while the thumb and the mitt portions are covered with areas of high coefficients of friction.

U.S. Pat. No. 5,848,440

Inventor: Nando Pajarola

Issued: Dec. 15, 1998

To provide, selectively, protection for the thumb of a user, especially during sporting events, such as skiing or snowboarding, or release of the thumb from the protection, the glove is formed with a strap (15) passing at least in part across the palm surface of the glove and having a loose or raised portion to define, with the palm of the hand, a loop (13) through which the thumb of the glove can be passed for protection, or withdrawal. The strap (15) is attached laterally from the root of the second or index finger of the glove on one side and, at the other side of the loop, in the region of the third and/or fourth finger of the glove. Preferably, one of the attachment members (15a) is releasable and reconnectable, for example formed by a hook and loop connection.

U.S. Pat. No. 5,887,282

Inventor: Klaus Lenhart

Issued: Mar. 30, 1999

A glove with an integrated wrist strap for a pole, such as ski poles, cross-country poles, hiking sticks, walking sticks and the like has an upper surface that defines a palm side, a back side, a wrist part and a thumb joint part. The wrist strap is formed integrally with the glove and includes a circumferentially adjustable loop part that wraps around the wrist part, an attachment part which extends on the palm side of the glove in the region of the thumb joint part, and a pull tab which extends on the outside of the glove. Also included is a binding element that is attached to the attachment part and the pull-tab. The binding element, the attachment part and the pull-tab are located adjacent the thumb joint part on the palm side of the glove. The pull-tab is embodied as at least partly elastic and secured releasably to the upper surface.

U.S. Pat. No. 6,014,775

Inventor: Ezra Missry

Issued: Jan. 18, 2000

An improved golf glove of a type having a pinkie engaging portion for engaging the pinkie, a ring finger engaging portion for engaging the ring finger, a middle finger engaging portion for engaging the middle finger, an index finger engaging portion for engaging the index finger, a thumb engaging portion for engaging the thumb, a palm engaging portion for engaging the palm, a back hand engaging portion for engaging the back of the hand, a wrist engaging portion for engaging the wrist and has a through slot that extends longitudinally along the back of the hand portion, a fastening flap fixedly attached at a fixed edge to the back of the hand portion to one side of the through slot and extending therefrom over the through slot to the back of the hand portion on the other side of the through slot where it is selectively maintained thereagainst by mating portions of hook and loop fasteners. The improvement includes a pair of magnets contained in the fastening flap. The pair of magnets serve accelerate blood flow in the ulnar artery, the pisiform bone, and the ulnar nerve. The improved blood flow acts in a therapeutic manner while at the same time improving feel during play.

U.S. Pat. No. 6,018,837

Inventor: Elizabeth M. Andreu

Issued: Feb. 1, 2000

A Cleaning and Scouring Glove for providing a waterproof glove useful for scrubbing and cleaning. The inventive device includes a waterproof glove including a palm portion, a back portion, finger stalls, and a thumb stall cooperatively joined together to fit a wearer's hand. A generally flexible scouring material is disposed on each of the finger stalls and the thumb stall, and a generally flexible absorptive material is provided on the palm portion of the glove thereby facilitating different types of washing actions with the same glove.

While these gloves having special features, some of them having vision clearing device designed for clearing goggles or glasses may be suitable for the purposes for which they were designed, they would not be as suitable for the purposes of the present invention, as hereinafter described.

SUMMARY OF THE PRESENT INVENTION

The present invention discloses a glove having an elongated elastomeric base member substantially positioned over the proximal thumb phalanx having a plurality of pliable bladelike elements whereby the wearer of the gloves can extend the thumb and in a single motion using the pliable blade-like elements, wipe the transparent visor portions of eye protection devices without totally obstructing the vision of the wearer. The elongated elastomeric member is comprised of a plurality of pliable blade-like elements exteriorly positioned on the glove extending through an aperture to a planar flange element located between the exterior glove material and the interior glove liner providing means for fixedly positioning the elongated elastomeric member to the exterior and/or interior layer of the glove by any means well known within the art, such as, bonding, sewing or riveting.

A primary object of the present invention is to provide a glove or gloves with means for clearing eye protective visually transparent elements of wet particle matter that may accumulate on said transparent elements.

Another object of the present invention is to provide a glove having an elongated elastomeric member exteriorly positioned substantially over the proximal thumb phalanx and extending parallel thereto.

Yet another object of the present invention is to provide a glove having an elongated elastomeric member having a plurality of pliable blade-like elements positioned thereon.

Still yet another object of the present invention is to provide a glove having an interior liner layer and an exterior surface layer having an elongated aperture extending parallel and over the outside of the thumb.

Another object of the present invention is to provide an elongated elastomeric member having a planar base flange element residing between a first glove exterior layer and a second glove interior layer.

Yet another object of the present invention is to provide an elongated elastomeric member having a planar flange element providing means for fixed positioning said elongated elastomeric member to said exterior glove layer and/or said interior glove liner.

Still yet another object of the present invention is to provide a glove having an elongated elastomeric member having a flange element fastened to said glove by any means known within the art, such as, bonding, sewing or riveting.

Another object of the present invention is to provide a glove having an elongated elastomeric member positioned over the thumb whereby the use thereof will not totally impair the vision during use.

Additional objects of the present invention will appear as the description proceeds.

The present invention overcomes the shortcomings of the prior art by providing glove(s) having an elongated elastomeric member positioned over the thumb having a plurality of pliable blade-like elements whereby the thumb of the wearer can be extended and in a single motion using the pliable blade-like elements, wipe the transparent portions of eye protection devices without totally obstructing the vision of the wearer.

The elongated elastomeric member has a plurality of pliable blade-like elements exteriorly positioned on the glove extending through an aperture to a planar flange element located between the exterior glove material and the interior glove liner providing means for anchoring said elongated elastomeric member to the exterior and/or interior layer of said glove by any means, such as, bonding, sewing or riveting.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

Figure 1:
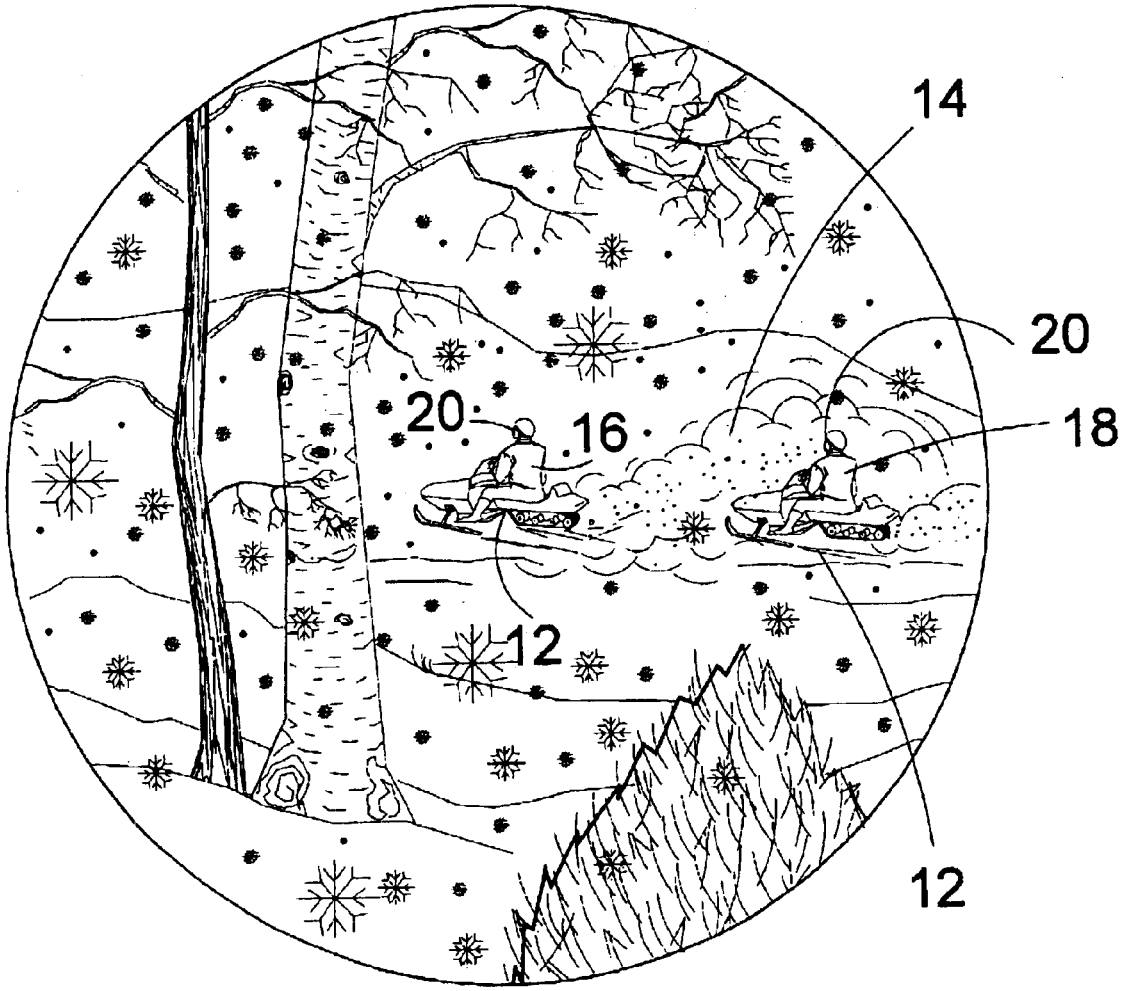
FIG. 1 is a pictorial view showing two snowmobilers, riding in conditions common to the sport. Snow, sleet, icing and spray from a rider in front, create hazardous conditions to a rider in the rear where wet particle matter may accumulate on the helmet visor of said rider.

The upper surface of the elongated elastomeric member has a plurality of ridges extending therefrom. The ridges being of various heights provides a device having various degrees of rigidity. While the highest ridges are the more pliable the lowest ridges provide a more rigid application when needed.

LIST OF REFERENCE NUMERALS

With regard to reference numerals used, the following numbering is used through the drawings.

10 present invention
11 glove
12 snowmobile/motorcycle/ATV
14 spray
16 front rider
18 rear rider
20 visor
22 rain
23 individual
24 helmet
26 particle matter
28 elastomeric blade members
30 thumb
32 fire fighter
34 elongated base member
36 outer layer
38 outer layer aperture
40 flange
42 inner layer
44 insulation
46 attachment means
48 channel
50 flap

DESCRIPTION OF THE PREFERRED EMBODIMENT(S)

In order that the invention may be more fully understood, it will now be described, by way of example, with reference to the accompanying drawings in which FIGS. 1 through 11 illustrate the present invention being a glove for cleaning the windshield of the rider's helmet.

Turning to FIG. 1, shown therein is a pictorial view showing two snowmobiles 12, riding in conditions common to the sport. Snow, sleet, icing and spray 14 from a rider 16 in front, create hazardous conditions to a rider 18 in the rear where wet particle matter may accumulate on the helmet visor 20 of the rider 18.

Figure 2:
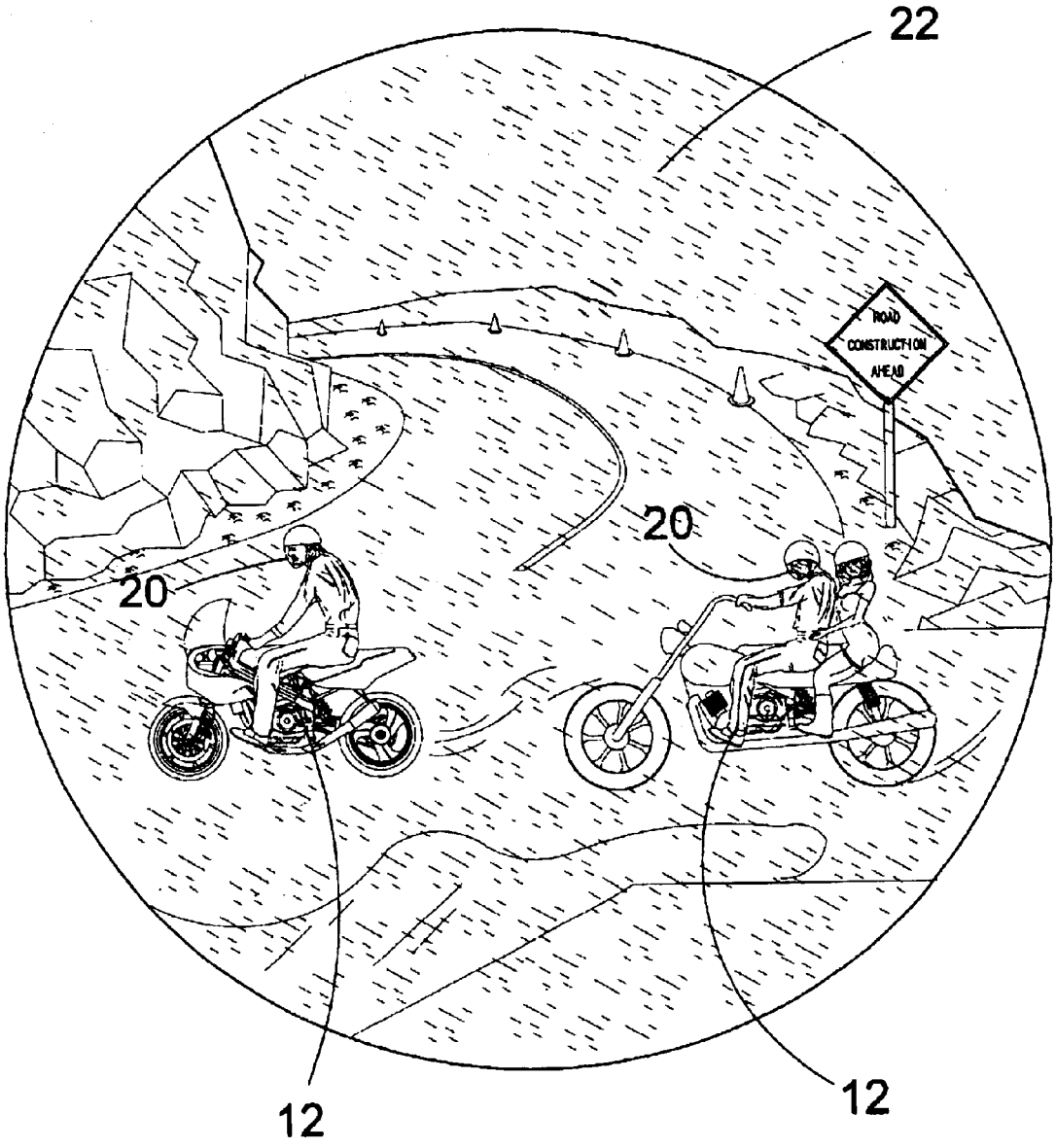
FIG. 2 is a pictorial view showing two motorcyclists riding in rainy weather conditions. The riders may clear their face shields using the pliable elastomeric elements of the glove by extending the thumb and with a single motion, wipe the transparent element of the helmet without completely obstructing their view.

Turning to FIG. 2, shown therein is a pictorial view showing two motorcyclists 12 riding in rainy 22 weather conditions. The riders may clear their face shields 20 using the pliable elastomeric elements of the glove of the present invention by extending the thumb and with a single motion, wipe the transparent element of the helmet without completely obstructing their view.

Figure 3:
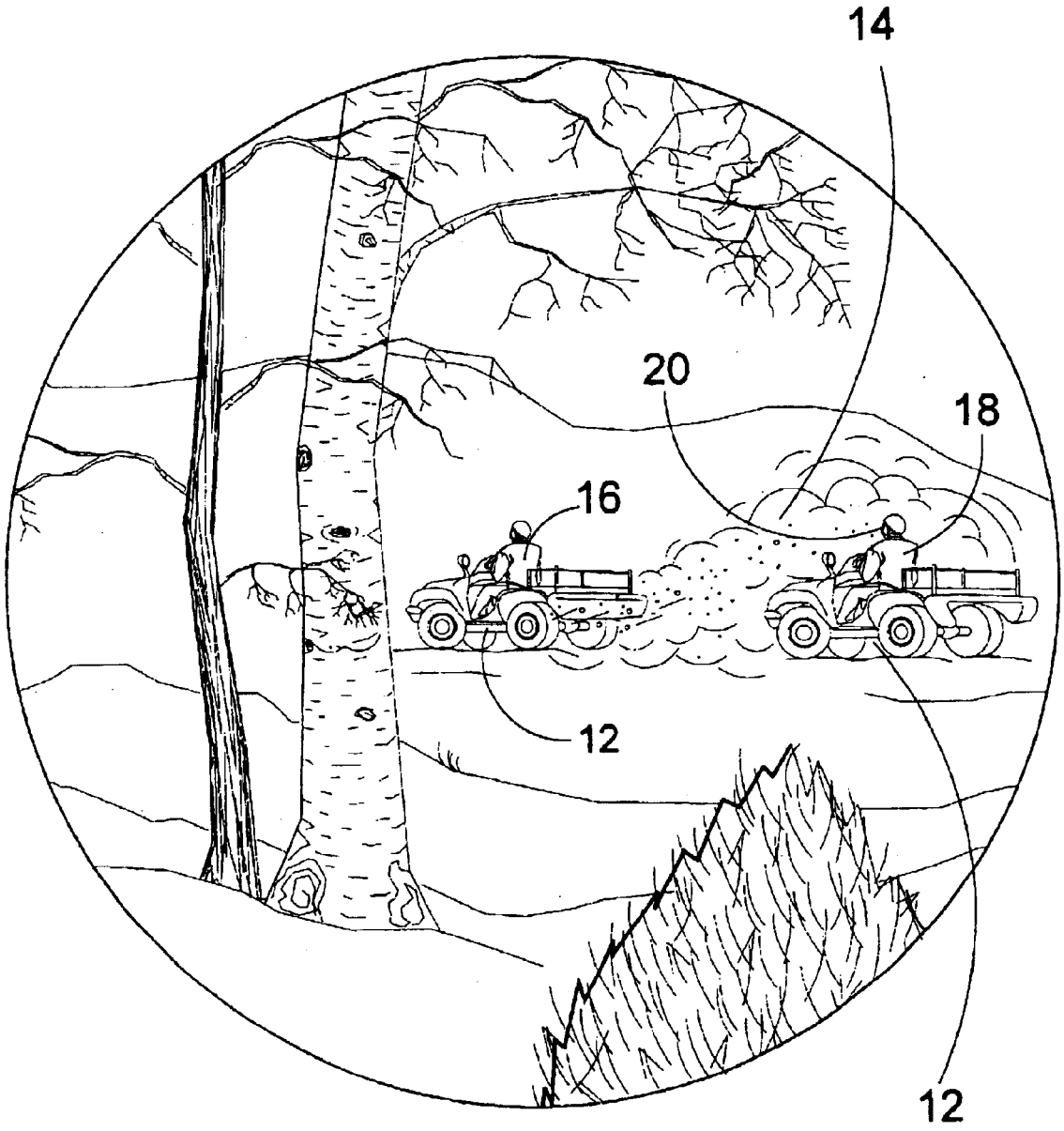
FIG. 3 is a pictorial view depicting two ATV riders, riding in conditions common to the sport, snow, sleet, icing and spray from the rider in front, creates hazardous visual conditions to the rider in the rear. Shown is particle matter that can accumulate on the helmet visor and shield worn by the rider in the rear.

Turning to FIG. 3, shown therein is a pictorial view depicting two ATV riders 12, riding in conditions common to the sport. Snow, sleet, icing and spray 14 from the rider 16 in front, creates hazardous visual conditions to the rider 18 in the rear. Shown is particle matter 14 that can accumulate on the helmet visor 20 and shield worn by the rider 18 in the rear.

Figure 4:
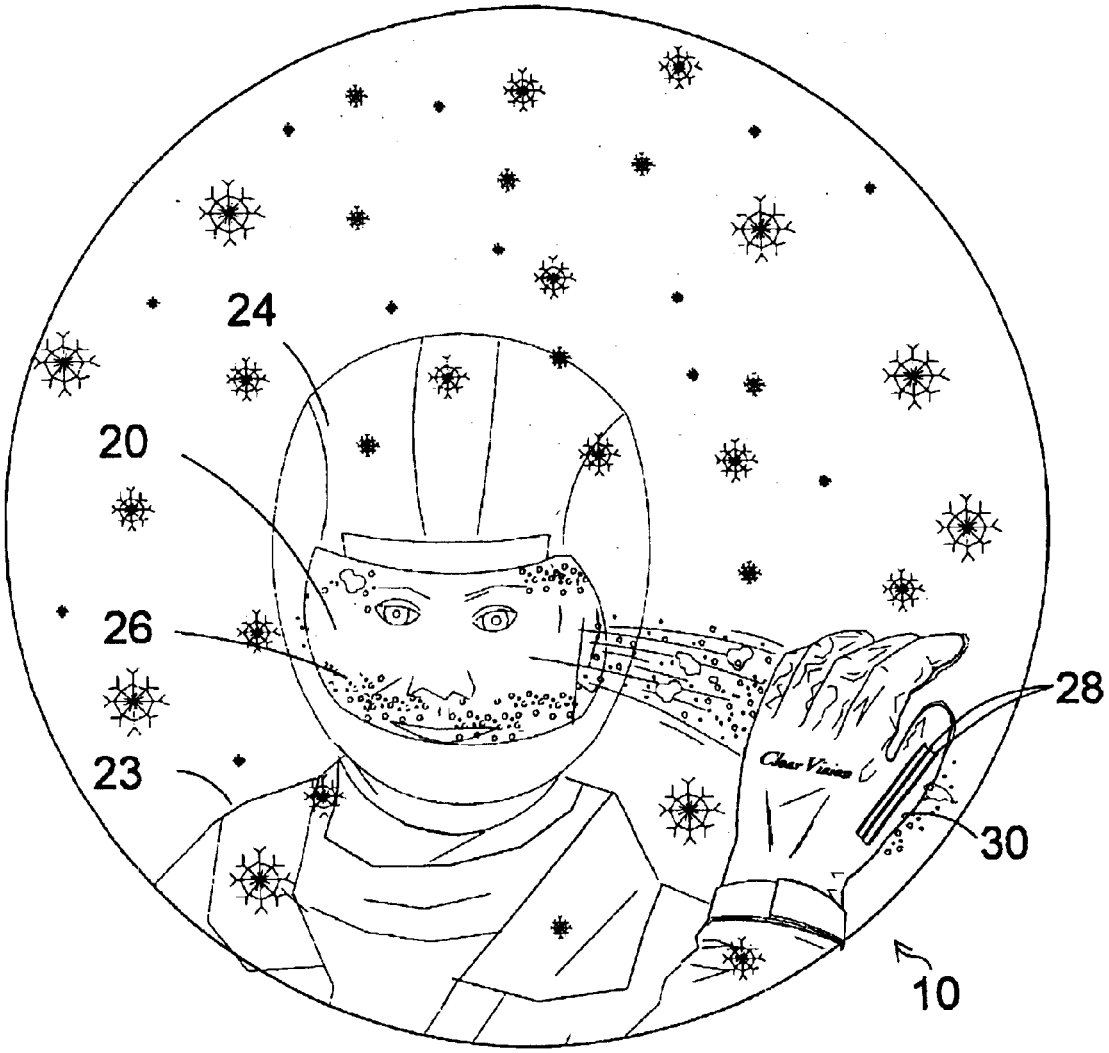
FIG. 4 is an illustration of the present invention in use. Shown is an individual wearing shielded helmet eye protective equipment whereupon an accumulation of wet particle matter has occurred. Using the glove having a plurality of pliable elastomeric members positioned substantially over the proximal thumb phalanx, the wearer is able to quickly remove the wet particle matter by extending the thumb and wiping the transparent element of the eye protective equipment with the pliable elastomeric element without substantially blocking his vision.

Turning to FIG. 4, shown therein is an illustration of the present invention 10 in use. Shown is an individual 23 wearing shielded helmet eye protective equipment 24 whereupon an accumulation of wet particle matter 26 has occurred. Using the glove 10 having a plurality of pliable elastomeric members 28 positioned substantially over the proximal thumb phalanx or glove thumb 30, the wearer 23 is able to quickly remove the wet particle matter 26 by extending the thumb 30 and wiping the transparent element 20 of the eye protective equipment 24 with the pliable elastomeric element 28 without substantially blocking his vision.

Figure 5:
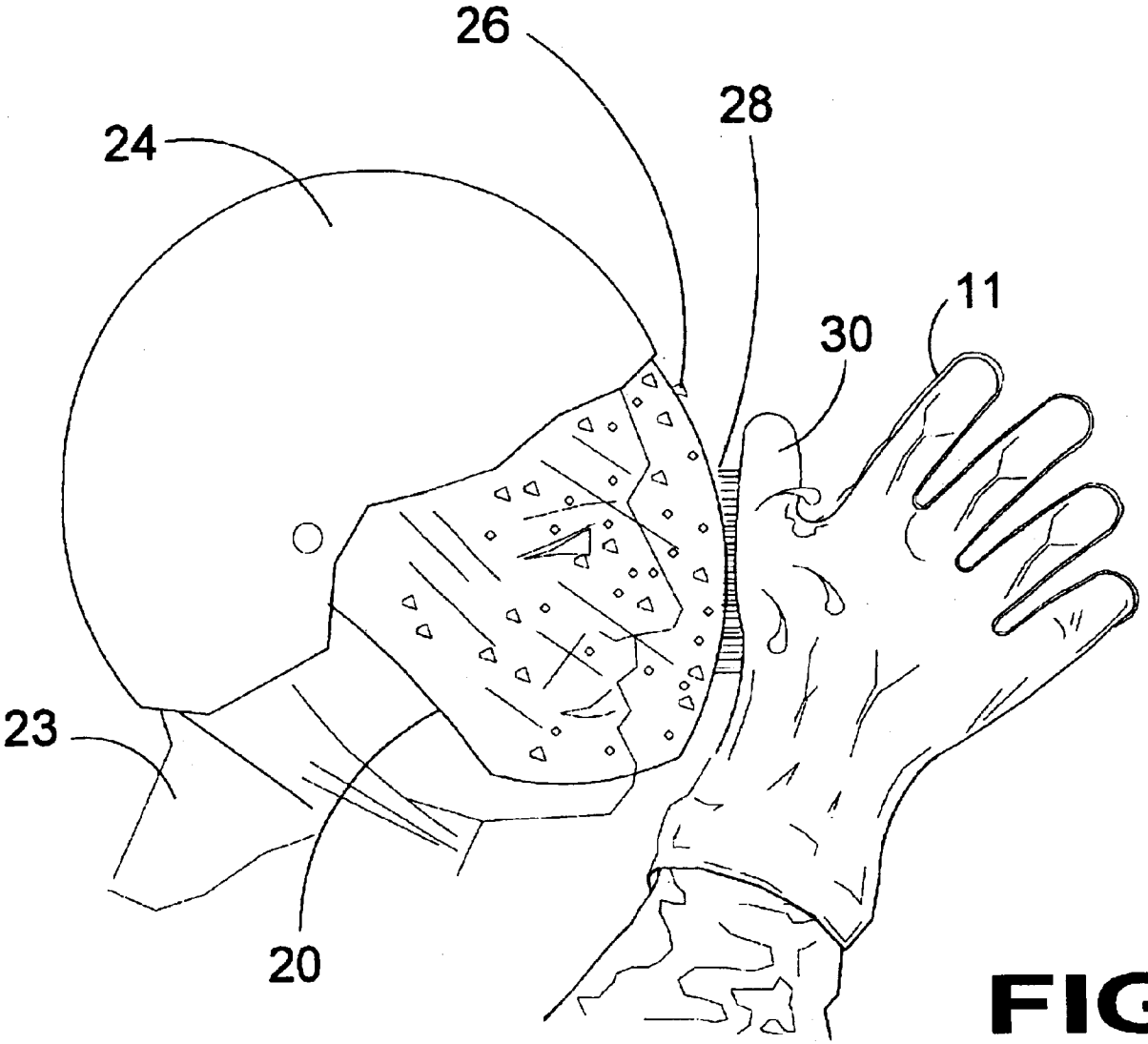
FIG. 5 is another illustration of the present invention in use. Shown is a side view of an individual wearing eye protective equipment whereupon an accumulation of wet particle matter has occurred. Using the glove having a plurality of pliable elastomeric members positioned substantially over the proximal thumb phalanx, the wearer is able to quickly remove the wet particle matter by extending the thumb and wiping the transparent element of the eye protective equipment with the pliable elastomeric element without substantially blocking his vision.

Turning to FIG. 5, shown therein is another illustration of the present invention 10 in use. Shown is a side view of an individual 23 wearing eye protective equipment 24 whereupon an accumulation of wet particle matter 26 has occurred. Using the glove 10 having a plurality of pliable elastomeric members 28 positioned substantially over the proximal thumb phalanx 30, the wearer 23 is able to quickly remove the wet particle matter 26 by extending the thumb 30 and wiping the transparent element 20 of the eye protective equipment with the pliable elastomeric element 28 without substantially blocking his vision.

Figure 6:
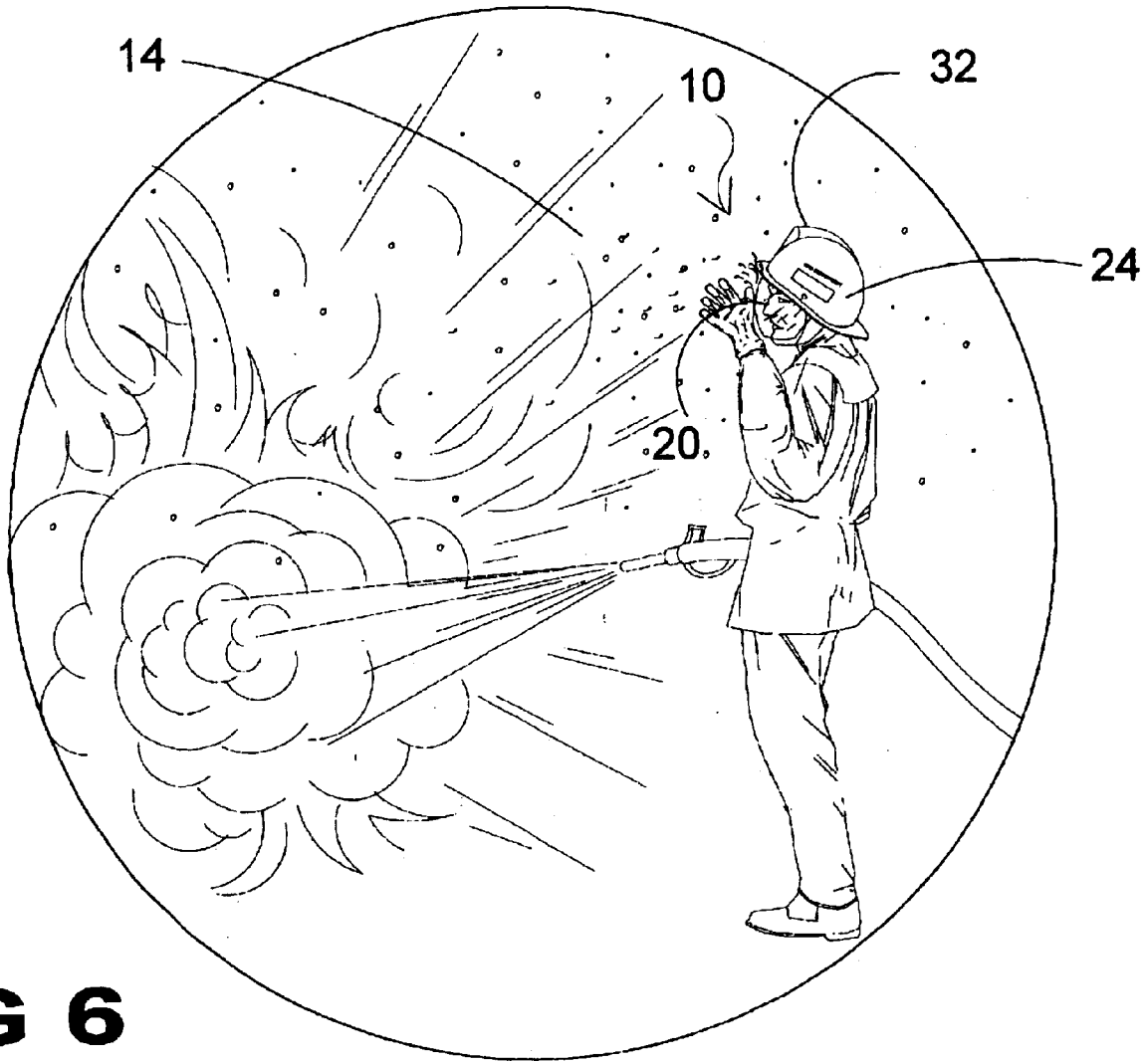
FIG. 6 is another illustration depicting a fireman being hit with back spray from the fire in which he is extinguishing. Using the glove having a plurality of pliable elastomeric members positioned substantially over the proximal thumb phalanx, the wearer is able to quickly remove the wet particle matter by extending the thumb and wiping the transparent element of the eye protective equipment with the pliable elastomeric element without substantially blocking his vision.

Turning to FIG. 6, shown therein is another illustration depicting a fireman 32 being hit with back spray 14 from the fire which he is extinguishing. Using the glove of the present invention 10 having a plurality of pliable elastomeric members positioned substantially over the proximal thumb phalanx, the wearer is able to quickly remove the wet particle matter by extending the thumb and wiping the transparent element 20 of the eye protective equipment 24 with the pliable elastomeric element without substantially blocking his vision.

Figure 7:
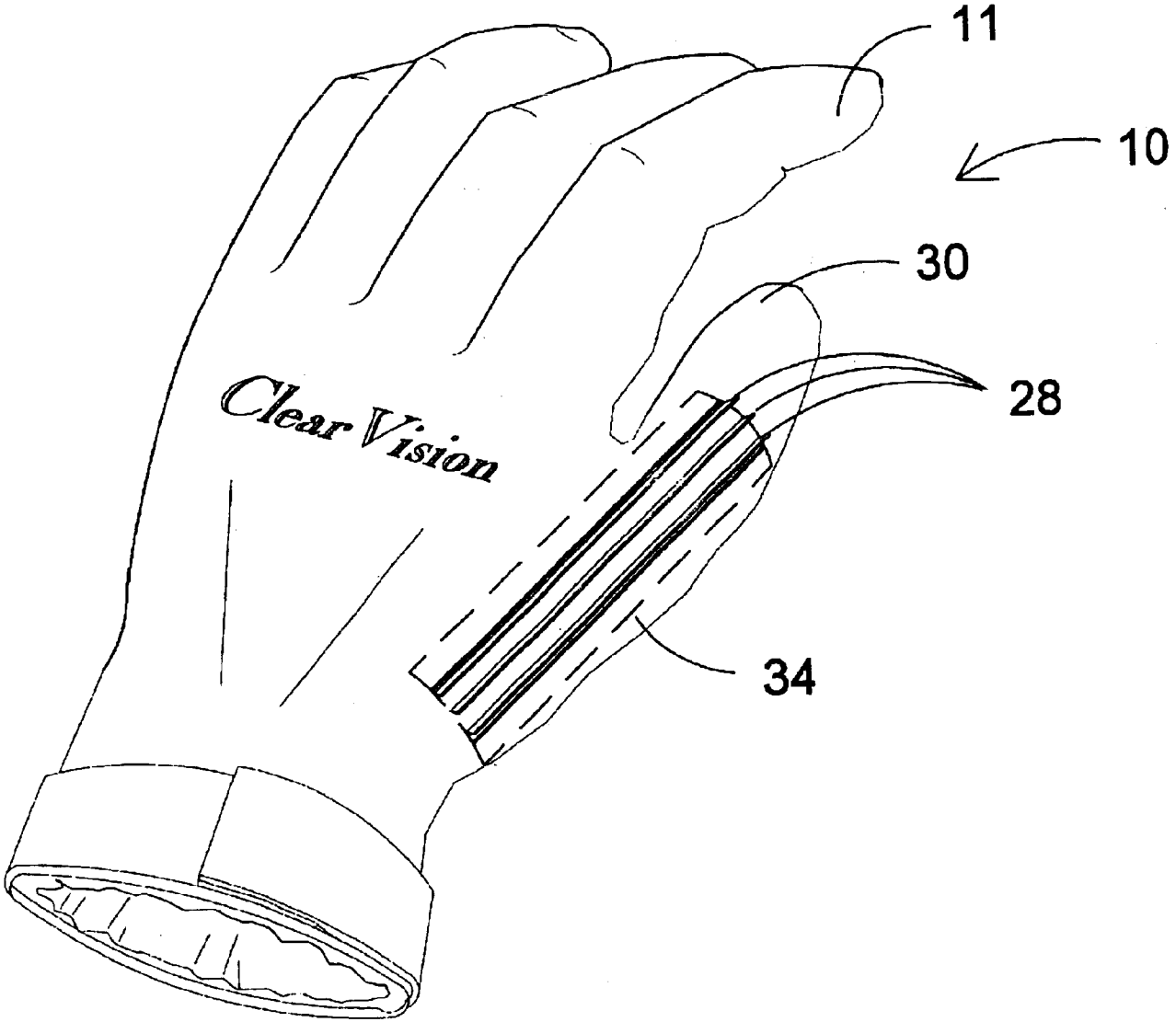
FIG. 7 is a perspective view of the present invention. Shown is a glove having an elongated elastomeric member positioned on the exterior thumb area having a plurality of projecting pliable elastomeric elements providing means for easily wiping the transparent elements of eye protective equipment. The positioning is such that a wearer can extend the thumb moving the pliable elastomeric elements into an engaging position with the transparent element of eye and face protective equipment without totally obstructing the vision and selectively move the pliable elastomeric elements across the transparent element until the obstruction has been removed.

Turning to FIG. 7, shown therein is a perspective view of the present invention 10. Shown is a glove 10 having an elongated elastomeric base member 34 positioned on the exterior or lateral surface of the thumb 30 area between the outer shell of glove 11 and the inner liner and insulation having a plurality of projecting pliable elastomeric elements 28 providing means for easily wiping the transparent elements of eye protective equipment. The orientation of base member 34 is such that a wearer can extend the thumb 30 thereby moving the pliable elastomeric elements 28 into an engaging position with the transparent element of eye and face protective equipment without totally obstructing the vision and then selectively move the pliable elastomeric elements 28 across the transparent element until the obstruction has been removed.

Figure 8:
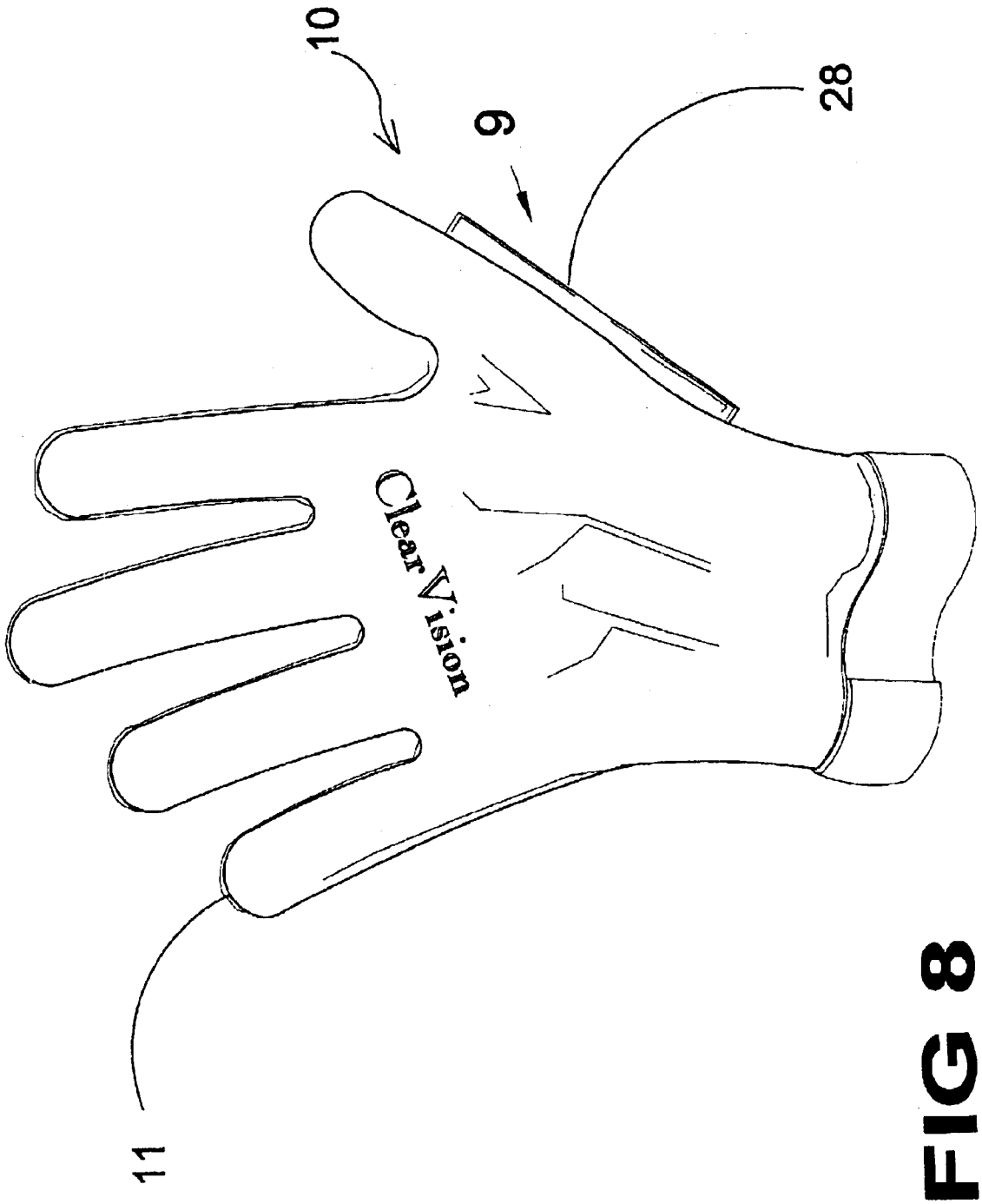
FIG. 8 is a front view of the present invention. Shown is a glove having an elongated elastomeric member fixed positioned to the exterior of the glove having a plurality of protruding pliable elastomeric blade-like elements extending therefrom.

Turning to FIG. 8, shown therein is a front view of the present invention 10. Shown is a glove 11 having an elongated elastomeric member fixedly positioned to the exterior edge of the left hand glove (presuming the rider is right-handed) of the present invention 10 being oriented in a relationship to wipe the visor of the helmet having a plurality of protruding pliable elastomeric blade-like elements 28 extending therefrom.

Figure 9:
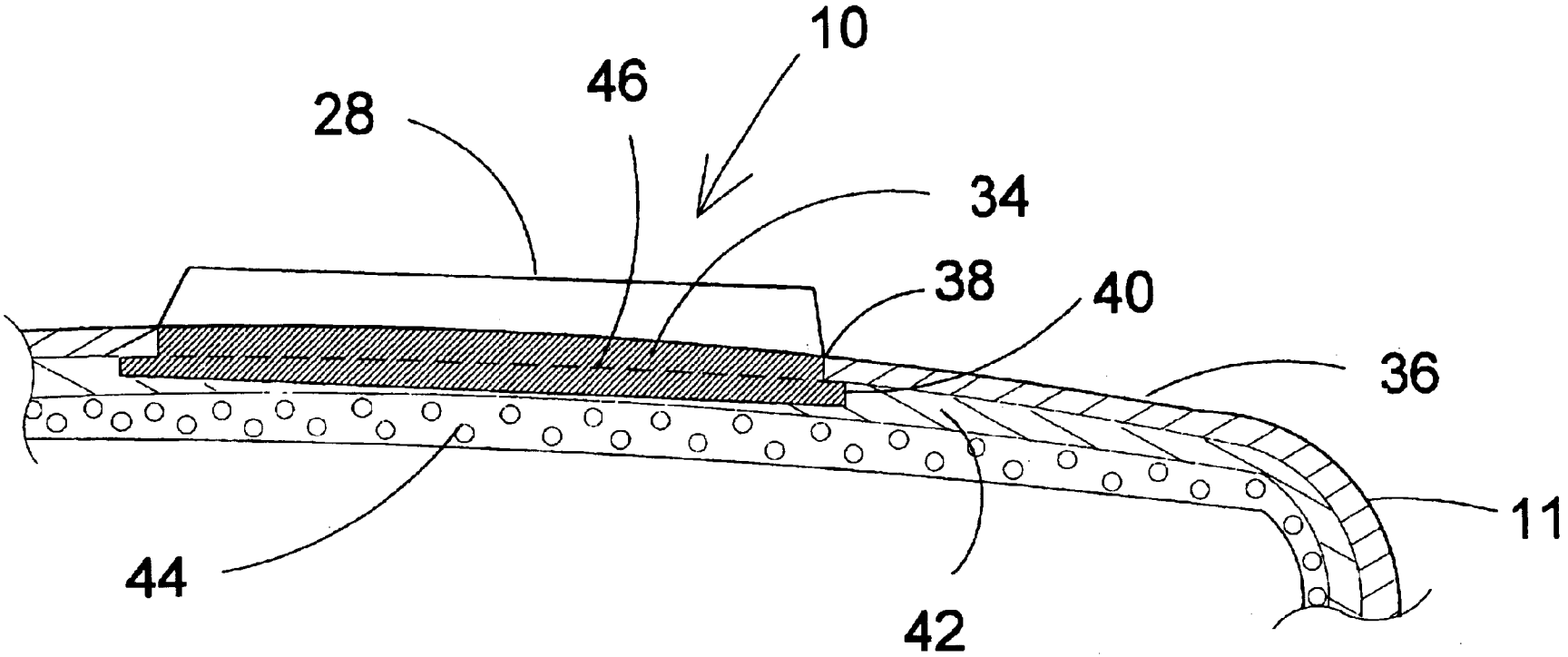
FIG. 9 is a sectional view of the present invention taken from FIG. 8 as indicated. Shown is a glove having an exterior layer having an aperture wherethrough extends the exterior portion of the elongated elastomeric member having a plurality of extending pliable blade-like elastomeric elements. The elongated elastomeric member has a planar flange element positioned between the glove exterior layer and the interior glove liner providing means for fixedly positioning said elongated elastomeric member to the exterior and/or interior layer of said glove by any means well known within the art, such as, bonding, sewing or riveting.

Turning to FIG. 9, shown therein is a sectional view of the present invention 10 taken from FIG. 8 as indicated. Shown is a glove 11 having an exterior layer or outer shell 36 having an aperture 38 through which extends the exterior portion of the elongated elastomeric base member 34 having a plurality of extending pliable blade-like elastomeric elements 28.

The elongated elastomeric member has a planar flange element 40 positioned between the glove exterior layer 36 and the interior glove liner 42 providing means for fixedly positioning said elongated elastomeric base member 34 to the exterior and/or interior layer 36, 42 of the glove 11 by any means 46 well known within the art, such as, bonding, sewing or riveting. Insulation layer 44 is also shown.

Figure 10:
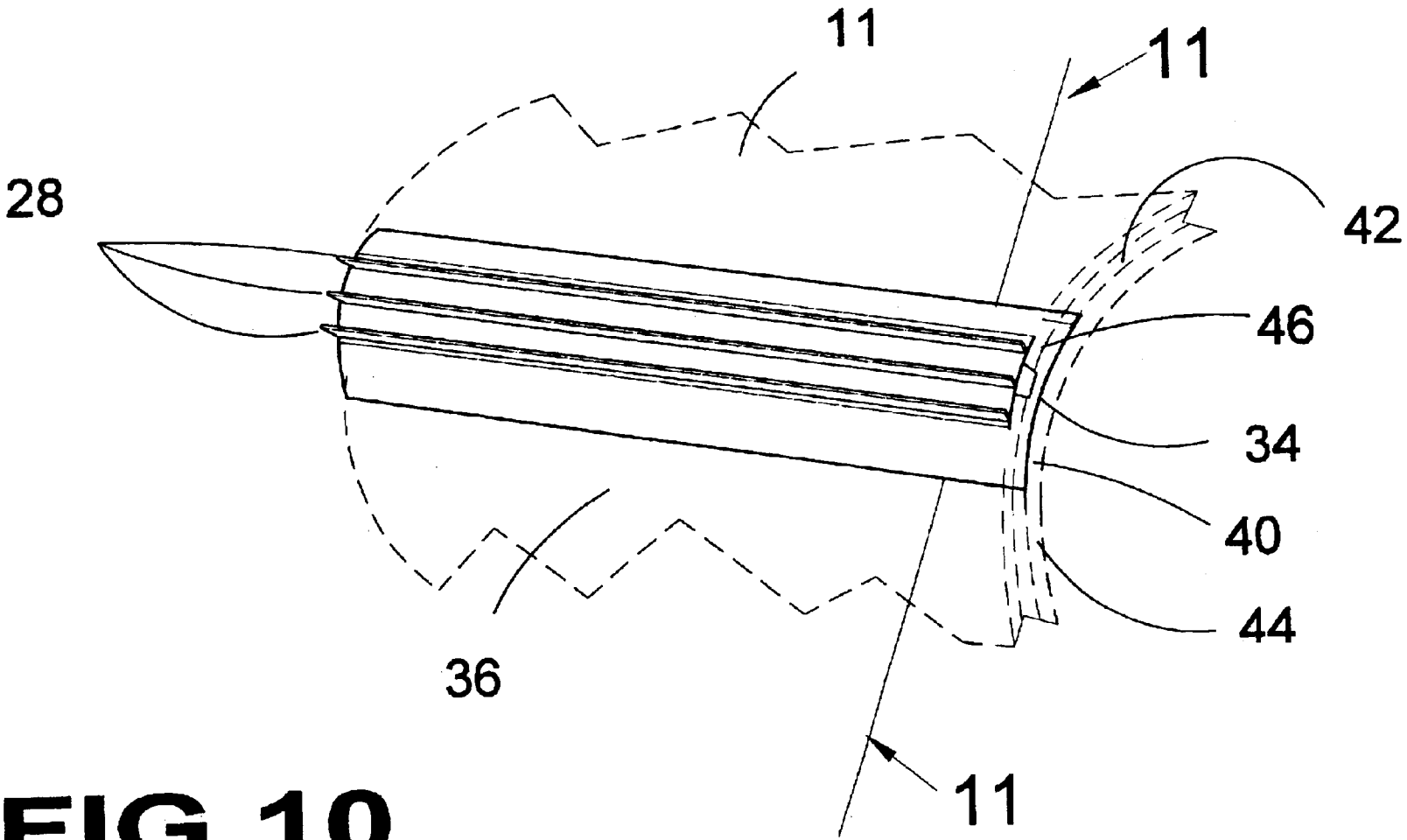
FIG. 10 is a perspective view of the elongated elastomeric member having a plurality of longitudinally projecting blade-like elements that are used to engage and clean the transparent elements of eye and face protective equipment. Also shown is the planar flange portion of the elongated elastomeric member that is positioned between the exterior glove material and the interior liner of the glove. The flange provides means for anchoring the elongated elastomeric element to the exterior and/or interior liner of the glove by any means known within the art, such as, bonding, sewing, or riveting.

Turning to FIG. 10, shown there is a perspective view of the elongated elastomeric base insert member 34 having a plurality of longitudinally projecting blade-like elements 28 that are used to engage and clean the transparent elements of eye and face protective equipment. Also shown is the planar flange portion 40 of the elongated elastomeric member that is positioned between the exterior glove material 36 and the interior liner 42 of the glove. The flange 40 provides means for anchoring the elongated elastomeric element 34 to the exterior 36 and/or interior insulation liner 44 of the glove 11 by any means 46 known within the art, such as, bonding, sewing, or riveting.

Figure 11:
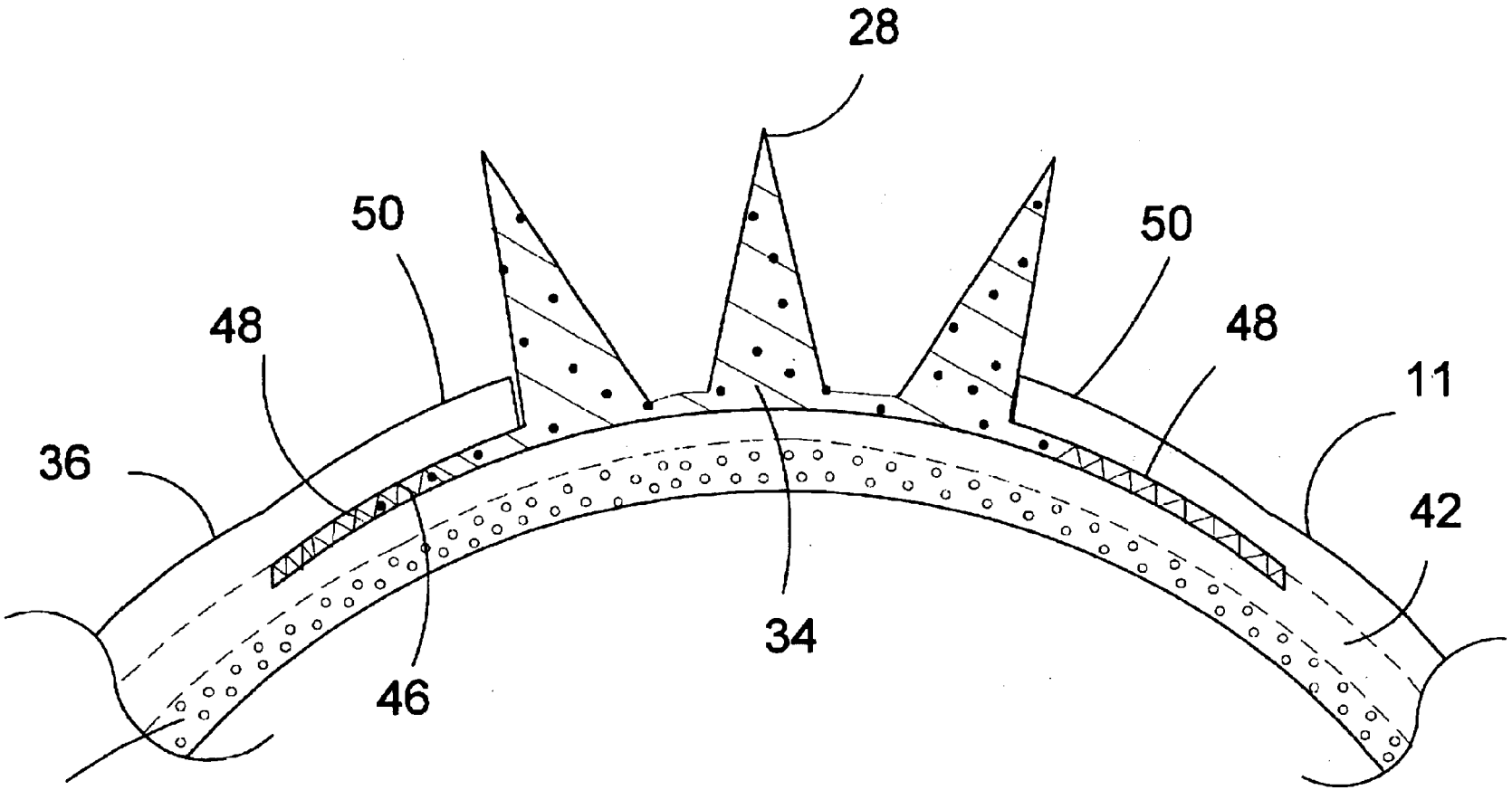
FIG. 11 is a partial sectional view of the upper thumb portion of the glove. Shown is the elongated elastomeric member having an exterior portion and an interior portion having connection means therebetween. Between the exterior portion and the interior portion there is a channel extending longitudinally along both sides wherein the exterior glove material resides which prevents any moisture wicking into the interior of the glove. The planar base member has been sown to the interior liner of said glove.

Turning to FIG. 11, shown therein is a partial sectional view of the thumb portion of the glove 11. Shown is the elongated elastomeric base member 34 having an exterior portion 36 and an interior portion 42 having connection means 46 therebetween. Between the exterior portion 36 and the interior portion 42 there is a channel 48 formed by flap 50 extending longitudinally along both sides of base insert 34 over which the exterior glove material 36 resides which prevents any moisture wicking into the interior of the glove 11. The planar base member has been sewn 46 to the interior liner 42 of the glove. The upper surface of the elongated elastomeric member 34 has a plurality of ridges 28 extending therefrom. The ridges 28 being of various heights provides a device having various degrees of rigidity. While the highest ridges 28 are the more pliable the lowest ridges provide a more rigid application when needed.

What is claimed to be new and desired to be protected by letters patent is set forth in the appended claims:

I claim:

[1. In a glove for being worn on the hand of a user which user is wearing a helmet with a visor thereon, the glove having a thumb thereon, the glove having an outer layer and an inner layer, the improvement comprising:

a) a base member disposed on the glove thumb, said base member being generally rectangular shaped, said base member disposed longitudinally along the glove thumb;

b) means for attaching said base member onto the glove thumb; and, c) a plurality of blade-like elements disposed on said base member, said blade-like elements disposed longitudinally along said base member for wiping the visor of a helmet.]

2. The apparatus of claim [1] *6*, wherein said base member is elastomeric.

3. The apparatus of claim [1] *6*, wherein said blade-like elements are elastomeric.

[4. The apparatus of claim 1, wherein said base member further comprises a flange for connection to the glove.]

[5. The apparatus of claim 4, the outer layer of the glove thumb has an aperture therein.]

6. [The apparatus of claim 5,] *In a glove for being worn on the hand of a user which user is wearing a helmet with a visor thereon, the glove having a thumb thereon, the glove having an outer layer and an inner layer, the improvement comprising:*

*a) a base member disposed on the glove thumb, said base member being generally rectangular shaped and having a flange for connection to the glove, said base member disposed longitudinally along the glove thumb;*

*b) means for attaching said base member onto the glove thumb; and,*

*c) a plurality of blade-like elements disposed on said base member, said blade-like elements disposed longitudi-*

*nally along said base member for wiping the visor of a helmet;* wherein [said aperture] *the outer layer of the glove thumb has an aperture therein which* is complimentarily sized to receive said flange of said base member.

7. The apparatus of claim 6, wherein said flange of said base member is disposed between the outer layer and the inner layer of the glove thumb.

8. The apparatus of claim 7, wherein the outer layer of the glove thumb further comprises a flap which folds over said flange of said base member, said flap forming a waterproof cover over said flange.

9. The apparatus of claim 8, wherein said means for attaching said base member onto the glove thumb further comprises sewing said flange to the outer layer and the inner layer of the glove thumb.

10. The apparatus of claim 8, wherein said means for attaching said base member onto the glove thumb further comprises bonding said flange to the outer layer and the inner layer of the glove thumb.

11. The apparatus of claim 8, wherein said means for attaching said base member onto the glove thumb further comprises riveting said flange to the outer layer and the inner layer of the glove thumb.

12. The apparatus of claim [1] *6*, wherein said plurality of blade-like elements vary in height, some elements being thereby longer than other elements.

13. The apparatus of claim 12, wherein said longer elements of said blade like elements are more pliable than said shorter blade-like elements.

14. The apparatus of claim [1] *6*, wherein said base member is disposed on the lateral surface of the glove thumb.

15. The apparatus of claim [1] *6*, further comprising an insulation layer disposed on the interior of the inner layer of the glove, said base member being attached thereto by said means for attaching.

*16. A glove to be worn on a wearer's hand for improving the wearer's visual conditions by removing obstacles to visibility from an eye protective device without completely obstructing the wearer's view, said glove comprising an inner layer, an outer layer; a thumb; a base member, at least a portion of said base member is disposed longitudinally on the thumb of the glove, said base member being permanently attached to the glove and having a flange for connection to the glove; and at least one blade-like element, at least a portion of which is disposed longitudinally on the thumb of the glove, said at least one blade-like element being disposed longitudinally on the base member and being permanently attached to the base member; and*

*wherein the outer layer of said glove has an aperture therein that is complimentarily sized to receive the flange, and said at least one blade-like element is positioned over at least a portion of a dorsal surface of a proximal thumb phalanx when said glove is worn by an intended wearer for whose hand the glove is sized correctly.*

*17. The glove of claim 16, comprising at least two blade-like elements, and wherein at least one of said blade-like elements varies in height from at least one other of said blade-like elements.*

*18. The glove of claim 16, comprising at least two blade-like elements, wherein at least one of said blade-like elements varies in rigidity from at least one other of said blade-like elements.*

*19. The glove of claim 16, wherein said base member is elastomeric.*

*20. The glove of claim 16, wherein said base member is attached to the glove by bonding, sewing, or riveting.*

*21. The glove of claim 16, wherein the outer layer of said glove further comprises a flap which folds over the flange, thereby forming a waterproof cover over the flange.*

*22. The glove of claim 16, wherein the flange is attached to the glove by disposing said flange between the outer layer of said glove and the inner layer of said glove and bonding, sewing, or riveting said flange to one or both of the outer layer of said glove and the inner layer of said glove.*

*23. The glove of claim 16, further comprising an insulating layer, and wherein the flange is attached to the glove by bonding, sewing, or riveting said flange to one or more of the outer layer of said glove, the inner layer of said glove, and the insulating layer of said glove.*

*24. A glove to be worn on a wearer's hand for improving the wearer's visual conditions by removing obstacles to visibility from an eye protective device without completely obstructing the wearer's view, said glove comprising:*

*a thumb and at least one blade-like element, at least a portion of which is disposed longitudinally on the thumb of the glove, said at least one blade-like element being permanently attached to the glove;*

*a base member, at least a portion of which is disposed longitudinally on the thumb of the glove, said base member being permanently attached to the glove;*

*wherein said at least one blade-like element is disposed longitudinally on the base member;*

*wherein said at least one blade-like element is permanently attached to the base member, and wherein said base member further comprises a flange for connection to the glove; and*

*an inner layer and an outer layer, wherein the outer layer of said glove has an aperture therein that is complimentarily sized to receive the flange.*

*25. The glove of claim 24, wherein the outer layer of said glove further comprises a flap which folds over the flange, thereby forming a waterproof cover over the flange.*

*26. The glove of claim 24, wherein the flange is attached to the glove by disposing said flange between the outer layer of said glove and the inner layer of said glove and bonding, sewing, or riveting said flange to one or both of the outer layer of said glove and the inner layer of said glove.*

*27. The glove of claim 24, further comprising an insulating layer, and wherein the flange is attached to the glove by bonding, sewing, or riveting said flange to one or more of the outer layer of said glove, the inner layer of said glove, and the insulating layer of said glove.*

* * * * *